US010212701B2

(12) United States Patent
Nakayasu

(10) Patent No.: US 10,212,701 B2
(45) Date of Patent: Feb. 19, 2019

(54) WIRELESS COMMUNICATION SYSTEM, BASE STATION AND WIRELESS COMMUNICATION METHOD

(71) Applicant: NEC Corporation, Tokyo (JP)

(72) Inventor: Kanada Nakayasu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 112 days.

(21) Appl. No.: 14/780,216

(22) PCT Filed: Feb. 26, 2014

(86) PCT No.: PCT/JP2014/000995
§ 371 (c)(1),
(2) Date: Sep. 25, 2015

(87) PCT Pub. No.: WO2014/167767
PCT Pub. Date: Oct. 16, 2014

(65) Prior Publication Data
US 2016/0057787 A1 Feb. 25, 2016

(30) Foreign Application Priority Data
Apr. 10, 2013 (JP) ................................ 2013-081924

(51) Int. Cl.
*H04W 72/04* (2009.01)
*H04W 92/20* (2009.01)
(Continued)

(52) U.S. Cl.
CPC ....... *H04W 72/0426* (2013.01); *H04W 76/10* (2018.02); *H04W 92/20* (2013.01); *H04W 16/32* (2013.01)

(58) Field of Classification Search
CPC ................................................ H04W 72/0406
See application file for complete search history.

(56) References Cited

U.S. PATENT DOCUMENTS 9,198,021 B2 11/2015 Tomici et al.
2010/0008293 A1 1/2010 Gupta
(Continued)

FOREIGN PATENT DOCUMENTS

EP 2712260 A1 3/2014
JP 2010-124462 6/2010
(Continued)

OTHER PUBLICATIONS

Japanese Office Action for Patent Application No. 2015-511080 dated Jul. 12, 2016.

(Continued)

*Primary Examiner* — Dang T Ton
(74) *Attorney, Agent, or Firm* — Young & Thompson

(57) ABSTRACT

The first base station (2) includes a first call processing unit (22) and a communication path establishment unit (24). The communication path establishment unit (24) performs processing for establishing a wireless link with the second base station (4). The first call processing unit (22) performs call processing for setting the wireless communication path to the second base station (4) via the communication path establishment unit (24). The second base station (4) includes a second call processing unit (42) and a transfer unit (46). The second call processing unit (42) performs call processing for setting the wireless communication path to the first base station (2). When the transfer unit (46) receives a signal for the call processing from the first base station (2), the transfer unit (46) transfers this signal to the second call processing unit (42).

12 Claims, 7 Drawing Sheets

100
120
CORE NETWORK APPARATUS
S1-IF
CALL PROCESSING FUNCTION UNIT
420
400
X2-IF
CALL PROCESSING FUNCTION UNIT
220
200
COMMUNICATION REGION B
COMMUNICATION REGION A

(51) Int. Cl.

| | |
|---|---|
| ***H04W 76/10*** | (2018.01) |
| *H04W 16/32* | (2009.01) |

(56) References Cited

U.S. PATENT DOCUMENTS

| | | | | |
|---|---|---|---|---|
| 2010/0202391 | A1 | 8/2010 | Palanki et al. | |
| 2011/0263264 | A1 | 10/2011 | Fan et al. | |
| 2012/0225646 | A1 | 9/2012 | Mochida et al. | |
| 2014/0120889 | A1* | 5/2014 | Shuman | H04W 84/18 455/416 |
| 2014/0120927 | A1 | 5/2014 | Liu | |
| 2016/0227471 | A1* | 8/2016 | De Foy | H04W 4/001 |

FOREIGN PATENT DOCUMENTS

| | | |
|---|---|---|
| JP | 2012-505578 | 3/2012 |
| JP | 2012-517769 | 8/2012 |
| JP | 2013-038586 | 2/2013 |
| WO | WO2011/055696 | 5/2011 |
| WO | WO 2011/069092 | 6/2011 |

OTHER PUBLICATIONS

CWTS/Huawei, IuNB: a new interface for the direct communication between NodeBs, R3-020113, 3GPP, Jan. 18, 2002.

CWTS/Huawei, Synchronization of active cells based on direct NodeB interconnections, R3-020114, 3GPP, Jan. 18, 2002.

3GPP TS 36.423 V10.5.0 (Mar. 2012), 3rd Generation Partnership Project; Technical Specification Group Radio Access Network; Evolved Universal Terrestrial Radio Access Network (E-UTRAN); X2 application protocol (X2AP) (Release 10).

International Search Report PCT/JP2014/000995 dated May 13, 2014.

Jose Puthenkulam, 802.16m Femto Drafting Group Output text, IEEE C802.16m-09/1644, IEEE 802.16 Task Group m (TGm), Jul. 16, 2009, paragraph 15.4.1, 15.4.5.

Extended European Search Report dated Oct. 18, 2016; Application No. 14782856.0.

JP Notice of Cancellation of Pretrial Reexamination dated May 9, 2017 in corresponding Japanese Patent Application No. 2015-511080.

Japanese Office Action for Application No. 2015-511080, dated Jun. 5, 2018, with English translation provided.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), Mar. 15, 2013.

* cited by examiner 400
300
202
204a
204b
200
FIRST BASE STATION
240
COMMUNICATION PATH ESTABLISHMENT FUNCTION UNIT
270
RF FUNCTION UNIT
260
BASEBAND FUNCTION UNIT
220
CALL PROCESSING FUNCTION UNIT
250
BACKHAUL FUNCTION UNIT
120
CORE NETWORK APPARATUS 200
500
404b
404a
SECOND BASE STATION
RF FUNCTION UNIT
470
400
BASEBAND FUNCTION UNIT
460
CALL PROCESSING FUNCTION UNIT
420
BACKHAUL FUNCTION UNIT
450
CORE NETWORK APPARATUS
120

400
300
600
MOBILE TERMINAL
204b
204a
282
FIRST BASE STATION
270
RF FUNCTION UNIT
280
260
BASEBAND FUNCTION UNIT
220
CALL PROCESSING FUNCTION UNIT
250
BACKHAUL FUNCTION UNIT
120
CORE NETWORK APPARATUS

WIRELESS COMMUNICATION SYSTEM, BASE STATION AND WIRELESS COMMUNICATION METHOD

TECHNICAL FIELD

The present invention relates to a wireless communication system, a base station and a wireless communication method, and in particular, to a wireless communication system, a base station and a wireless communication method in which communication is performed between base stations.

BACKGROUND ART

In recent years, traffic has rapidly increased along with the popularization of mobile terminals such as a mobile phone or a smartphone. Therefore, for the LTE (Long Term Evolution) scheme, microcell base stations which cover the relatively small communication regions (cells) with, for example, a radius of about a few meters to a few ten meters, as well as macrocell base stations which cover the relatively large communication regions with, for example, a radius of about a few hundred meters to a few kilometers, are installed. This microcell base station is installed at, for example, a region in which traffic concentrates, a coverage hole in which communication cannot be locally performed or the like within the communication region of the macrocell base station. By installing the microcell base station like this, the frequency usage efficiency is enhanced.

The communication between the macrocell base station and the microcell base station is performed using the X2 interface via a mobile backhaul. However, the inter-base-station communication is performed so that base stations which are logically adjacent are connected into a mesh form. Therefore, the data which is defined by, for example, the X2 application protocol (X2AP) is transmitted to the mobile backhaul or a core network. Thus, there is a possibility that the load of the mobile backhaul or the core network may increase.

With reference to the above-mentioned technique, for example, Patent Literature 1 discloses a system and a method for facilitating the inter-access-point communication by using an air interface which is the same as the one used for providing services to wireless devices.

Patent Literature 2 discloses a base station transceiver including a wireless interface which has a first coverage area surrounding a second coverage area of a second base station transceiver.

Non Patent Literature 1 discloses details of the X2 interface, which is an interface for the inter-base-station communication, and the X2AP.

CITATION LIST

Patent Literature

Patent Literature 1: Published Japanese Translation of PCT International Publication for Patent Application, No. 2012-517769

Patent Literature 2: Japanese Unexamined Patent Application Publication, No. 2010-124462

Non Patent Literature

Non Patent Literature 1: 3GPP TS 36.423 V10.5.0

SUMMARY OF INVENTION

Technical Problem

Note that Patent Literature 2 only discloses the adjustment of interference in the communication system in which both the macrocell and the femtocell are present, and does not disclose an establishment of a communication path between the base stations. Further, Non Patent Literature 1 does not disclose specific configurations for establishing the communication path between the base stations.

Moreover, in Patent Literature 1, the communication between the access points becomes possible by newly adding components which are, for example, shown in its FIGS. 2 and 3 (e.g., a parameter measurement component 306, a resource negotiation component 308, a resource negotiation reception component 312, a resource assignment component 314 and the like). It is necessary to add multiple components to existing base stations in the above way in order to perform the communication between the base stations.

The purpose of the present invention is to solve the above problems and an object of the present invention is to provide a wireless communication system, a base station and a wireless communication method in which by the addition or modification of a few components, not through a mobile network or a core network, a wireless communication path can be established between base stations.

Solution to Problem

A wireless communication system according to the present invention includes: a first base station; and a second base station having a wireless communication region in which the first base station is included, in which the first base station includes: communication path establishment means for performing processing for establishing a wireless link for transmitting and receiving control information with the second base station; and first call processing means for performing call processing for setting a wireless communication path to the second base station via the communication path establishment means, the second base station includes: second call processing means for performing call processing for setting a wireless communication path to the first base station; and transfer means for, when the transfer means receives a signal for call processing from the first base station, transferring the signal to the second call processing means, and the first call processing means and the second call processing means establish a wireless communication path.

A base station according to the present invention includes: communication path establishment means for performing processing for at least establishing a wireless link for transmitting and receiving control information with at least other base station; and call processing means for performing call processing for setting a wireless communication path to the other base station via the communication path establishment means.

A base station according to the present invention includes: connection means to which a mobile terminal can be connected; and call processing means for performing call processing for setting a communication path to another base station, in which when the mobile terminal is connected to the connection means, the call processing means performs call processing for setting a wireless communication path to the other base station via the mobile terminal, and the mobile terminal performs processing for establishing a wireless link for transmitting and receiving control information with the other base station.

A base station according to the present invention includes: call processing means for performing call processing for setting a wireless communication path to another base station; and transfer means for, when the transfer means receives a signal for call processing from the other base station, transferring the signal to the call processing means, in which the call processing means establishes a wireless communication path with the other base station when the signal is transferred from the transfer means.

A wireless communication method according to the present invention includes: performing processing for establishing a wireless link for transmitting and receiving control information between a plurality of base stations; performing call processing for setting a wireless communication path to at least one base station of the plurality of the base stations; and establishing a wireless communication path between the plurality of the base stations.

Advantageous Effects of Invention

According to the present invention, it is possible to provide a wireless communication system, a base station and a wireless communication method in which by the addition or modification of a few components, not through a mobile network or a core network, a wireless communication path can be established between base stations.

DESCRIPTION OF EMBODIMENTS

Outline of the Exemplary Embodiments According to the Present Invention

Figure 1:
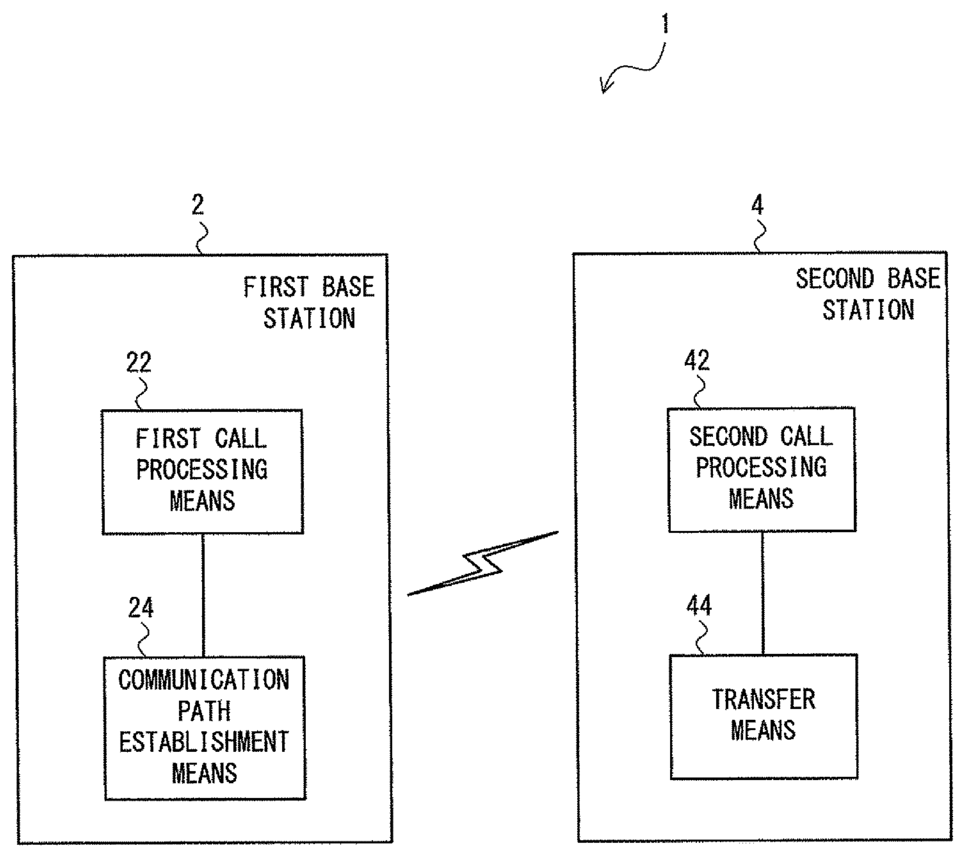
FIG. 1 is a diagram showing an outline of a wireless communication system according to the exemplary embodiments of the present invention.

Prior to exemplary explanations of embodiments, an outline of an exemplary embodiment is explained with reference to FIG. 1. FIG. 1 is a diagram showing an outline of a wireless communication system 1 according to the exemplary embodiments of the present invention. As shown in FIG. 1, the wireless communication system 1 includes a first base station 2 and a second base station 4 having a wireless communication region in which the first base station 2 is included.

The first base station 2 includes a first call processing means 22 and a communication path establishment means 24. The communication path establishment means 24 performs processing for establishing a wireless link with the second base station 4. The first call processing means 22 performs call processing for setting the wireless communication path to the second base station 4 via the communication path establishment means 24.

The second base station 4 includes a second call processing means 42 and a transfer means 46. The second call processing means 42 performs call processing for setting the wireless communication path with the first base station 2. When the transfer means 46 receives a signal for the call processing from the first base station 2, the transfer means 46 transfers this signal to the second call processing means 42. Further, the first call processing means 22 and the second call processing means 42 establish the wireless communication path.

According to the wireless communication system 1 according to the exemplary embodiments of the present invention, by addition or modification of a few components, not through a core network, it is possible to establish a wireless communication path between the base stations. Note that, according to each of the first base station 2 and the second base station 4, it is also possible, by addition or modification of a few components, not through a core network, to establish a wireless communication path between the base stations.

First Exemplary Embodiment

Hereinafter, exemplary embodiments are explained with reference to the drawings.

Figure 2:
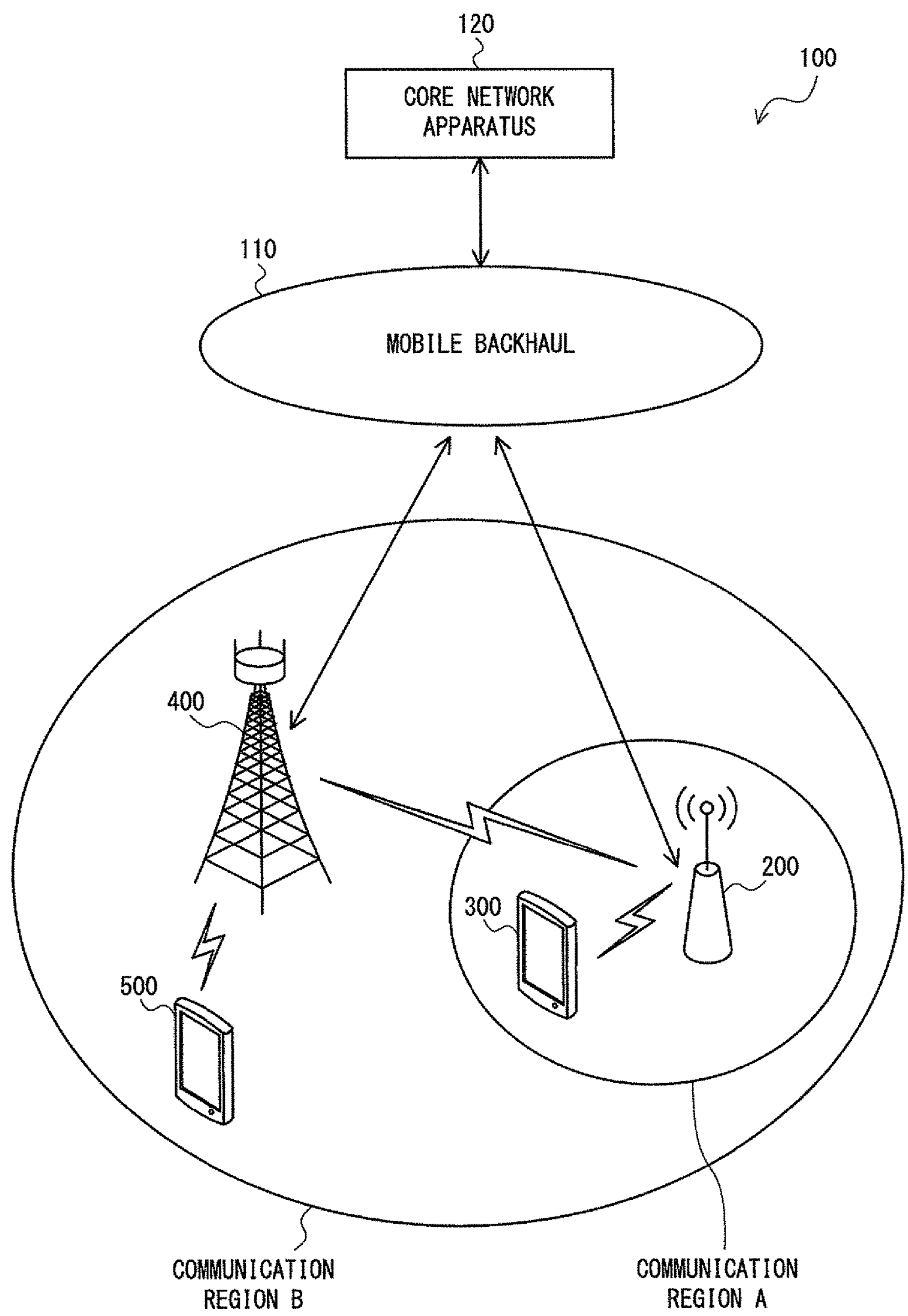
FIG. 2 shows a wireless communication system according to the first exemplary embodiment.

FIG. 2 shows a wireless communication system 100 according to the first exemplary embodiment. The wireless communication system 100 includes a first base station 200 and a second base station 400. Each of the first base station 200 and the second base station 400 are connected to a core network apparatus 120 via a mobile backhaul 110. Note that the wireless communication system 100 may comply with, for example, the LTE scheme. However, the wireless communication system 100 is not limited to this scheme.

The first base station 200 is, for example, a microcell base station which covers the relatively small communication region (cell) A with a radius of about a few meters to a few ten meters. On the other hand, the second base station 400 is, for example, a macrocell base station which covers the relatively large communication region (cell) B with a radius of about a few hundred meters to a few kilometers. Note that at least part of the communication region A of the first base station 200 may be included in the communication region B of the second base station 400. In other words, the first base station 200 and the second base station 400 can perform wireless communication with each other.

Further, the first base station 200 performs wireless communication with a first mobile terminal 300 which is in its communication region A. In a similar way, the second base station 400 performs wireless communication with a second mobile terminal 500 which is in its communication region B. Note that the configurations of the first base station 200 and the second base station 400 are described later.

The core network apparatus 120 is, for example, an ePC (evolved Packet Core). The core network apparatus 120 is an apparatus group including one or more apparatus. The core network apparatus 120 may include, for example, an MME (Mobility Management Entity), an HSS (Home Subscriber Server), a gateway and the like which comply with the LTE scheme. The first base station 200 and the second base station 400 are connected to the core network apparatus 120 via wire-lines.

Figure 3:
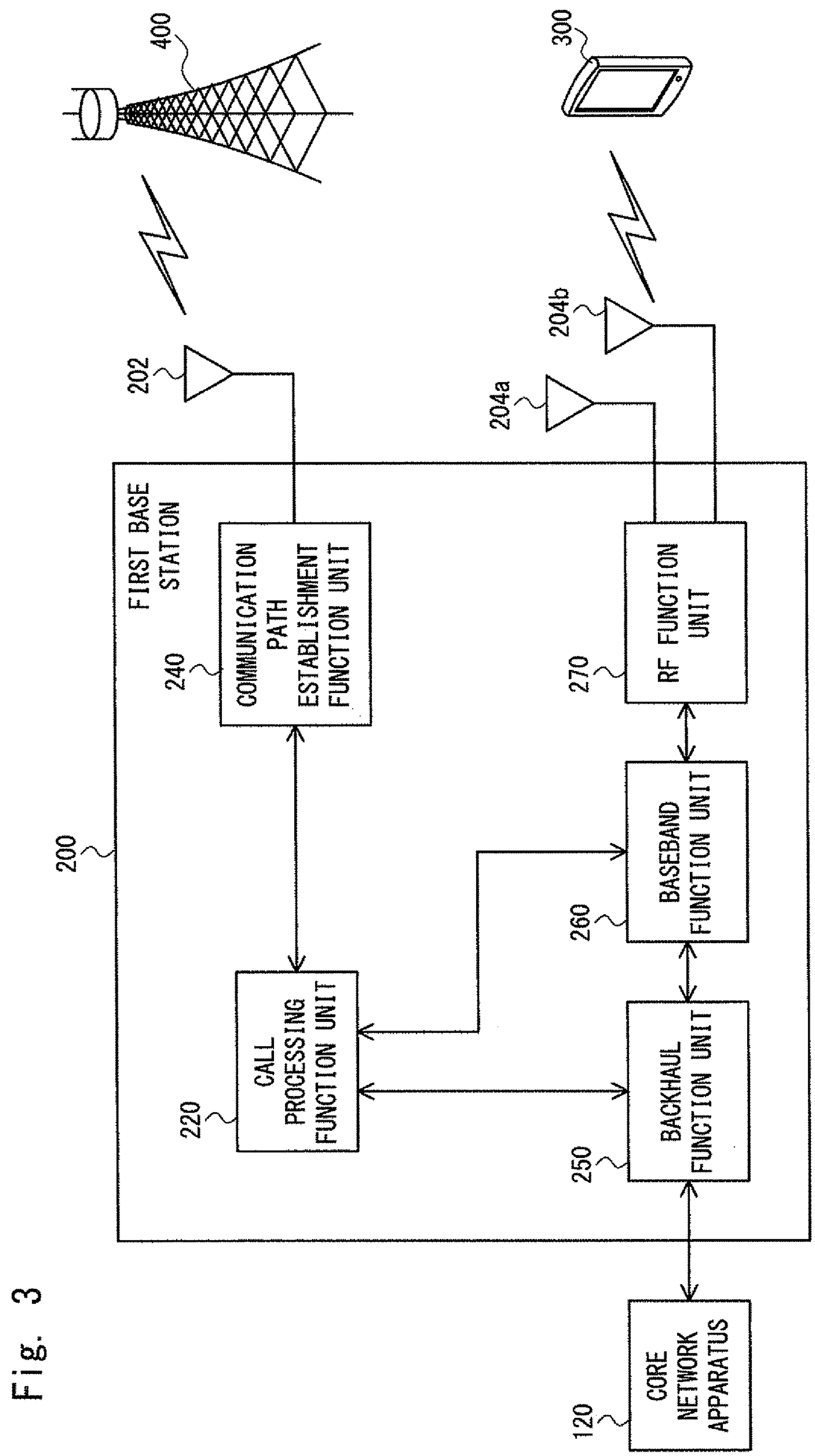
FIG. 3 shows a configuration of the first base station according to the first exemplary embodiment.

FIG. 3 shows a configuration of the first base station 200. The first base station 200 includes antennas 202, 204*a* and 204*b*, a call processing function unit 220, a communication path establishment function unit 240, a backhaul function unit 250, a baseband function unit 260 and an RF (Radio Frequency) function unit 270.

Each component of the first base station 200 may be implemented by, for example, hardware such as electronic circuits. Further, the processing of each component of the first base station 200 may be implemented by executing a program under the control of an arithmetic device (not shown) included in the first base station 200 which is a computer. More specifically, the processing may be implemented by loading a program stored in a storage medium (not shown) included in the first base station 200 into a memory (not shown), and then executing the program under the control of the arithmetic device.

The call processing function unit 220 is, for example, an RRC (Radio Resource Control). The call processing function unit 220 performs the call processing with the core network apparatus 120 via the backhaul function unit 250 and performs processing for establishing the communication path between the core network apparatus 120 and the first mobile terminal 300. Further, when the call processing function unit 220 receives a connection request signal from the first mobile terminal 300 in its communication region A via the RF function unit 270 and the baseband function unit 260, the call processing function unit 220 performs processing for establishing the communication path with that first mobile terminal 300. In other words, the call processing function unit 220 acts as an RRC signal termination point for setting a data communication path with the first mobile terminal 300 via the RF function unit 270 and the baseband function unit 260.

Further, as described later, the call processing function unit 220 performs the call processing with the second base station 400 via the communication path establishment function unit 240 and performs processing for establishing the wireless communication path with the second base station 400. In this case, the call processing function unit 220 transmits a signal indicating a request for connection to the second base station 400 (the connection request signal) to the second base station 400 via the communication path establishment function unit 240. This connection request signal includes inter-base-station communication path setting information indicating the setting of the wireless communication path between the first base station 200 and the second base station 400. Note that the connection request signal may be, for example, ConnectionSetupRequest.

The communication path establishment function unit 240 performs processing for establishing the wireless communication path (the wireless link) with the second base station 400. Further, the communication path establishment function unit 240 performs processing for transmitting wireless signals to/receiving them from the second base station 400. Note that the communication path establishment function unit 240 may include functions which are included in general existing mobile terminals for performing wireless communication with the base station. In other words, the communication path establishment function unit 240 may be implemented by applying functions of general existing mobile terminals. That is, the first base station 200 is configured to perform the wireless communication with the second base station 400 using the communication path establishment function unit 240, as if the first base station 200 itself is a mobile terminal.

Note that the wireless communication path between the first base station 200 and the second base station 400 may comply with, for example, the X2 interface. In other words, the signal from the call processing function unit 220 may comply with the X2 interface. The communication path establishment function unit 240 then performs processing such as modulation processing and amplification processing for the signals from the call processing function unit 220, and transmits the wireless signals to the second base station 400 via the antenna 202. Further, the communication path establishment function unit 240 receives the wireless signals from the second base station 400 via the antenna 202, performs processing such as demodulation processing and amplification processing to comply with, for example, the X2 interface, and outputs the processed signals to the call processing function unit 220. In this case, the communication path establishment function unit 240 performs wireless communication directly with the second base station 400, not through the mobile backhaul 110 and the core network apparatus 120.

The backhaul function unit 250 performs processing necessary for performing communication with the core network apparatus 120 via the mobile backhaul 110. For example, the backhaul function unit 250 performs the conversion processing which complies with communication interface with the core network apparatus 120 such as S1 interface, and performs processing for transmitting signals. Specifically, the backhaul function unit 250 performs the conversion processing, which complies with, for example, the S1 interface, for the signals from the core network apparatus 120, and outputs the converted data to the baseband function unit 260 or the call processing function unit 220. Further, the backhaul function unit 250 performs the conversion processing, which complies with, for example, the S1 interface, for data from the baseband function unit 260, and outputs the converted data to the core network apparatus 120.

The baseband function unit 260 performs processing related to baseband signals. Specifically, the baseband function unit 260 performs conversion processing for data from the backhaul function unit 250 to generate baseband signals, and outputs the baseband signals to the RF function unit 270. Further, the baseband function unit 260 performs conversion processing for the baseband signals from the RF function unit 270 to generate data, and outputs the data to the backhaul function unit 250. Note that, when the baseband function unit 260 receives the connection request signal from the first mobile terminal 300, the baseband function unit 260 may output the connection request signal to the call processing function unit 220.

The RF function unit 270 performs processing necessary for wireless communication such as the modulation/demodulation processing and the amplification processing. Specifically, the RF function unit 270 performs processing such as the modulation processing and the amplification processing for the baseband signal output from the baseband function unit 260, and transmits the wireless signal to the first mobile terminal 300 via the antennas 204*a* and 204*b*. Further, the RF function unit 270 receives the wireless signal from the first mobile terminal 300 via the antennas 204*a* and 204*b*, performs processing such as the demodulation processing and the amplification processing to convert the wireless signal into the baseband signal, and transmits the baseband signal to the baseband function unit 260.

Figure 4:
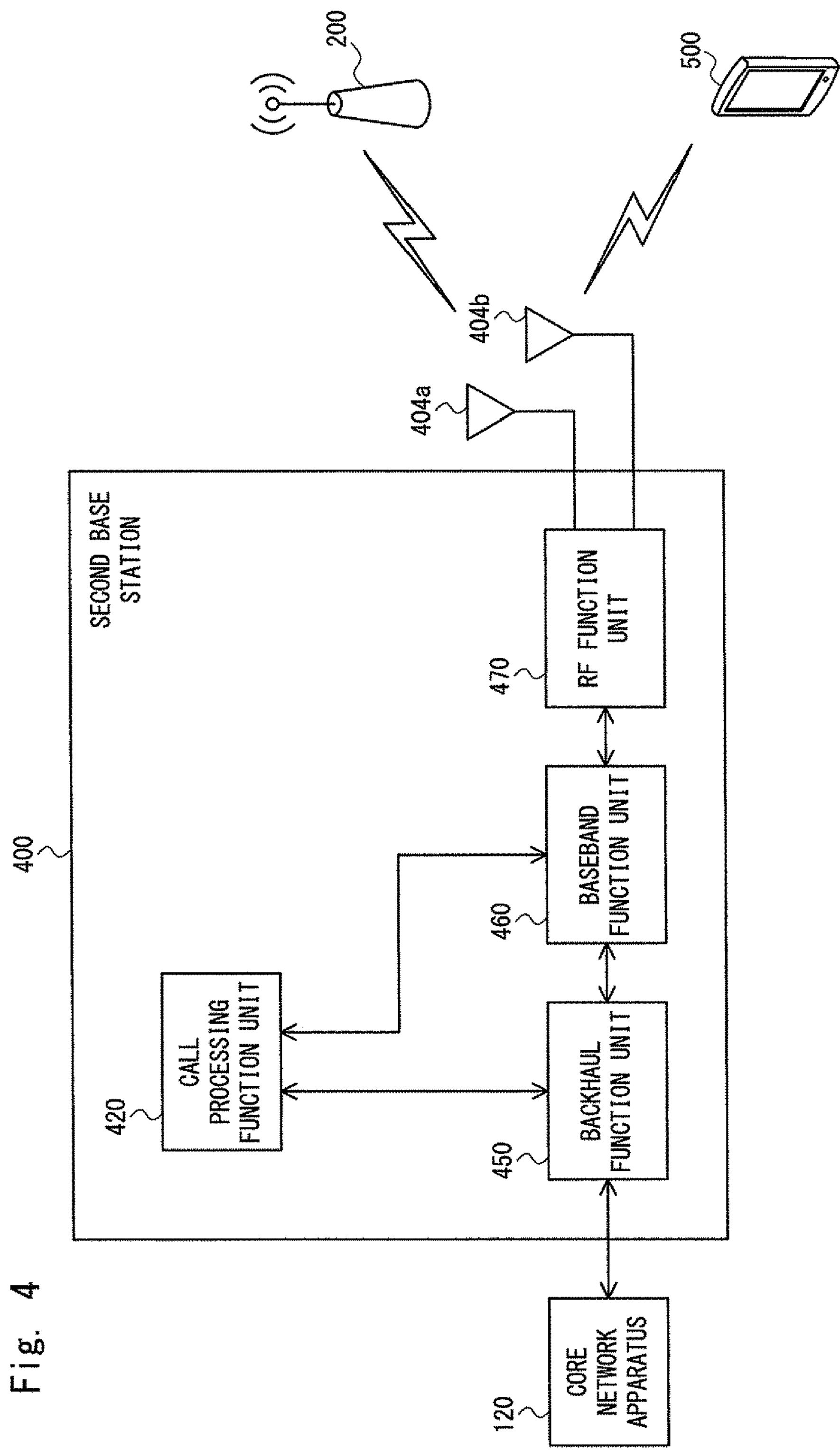
FIG. 4 shows a configuration of the second base station according to the first exemplary embodiment.

FIG. 4 shows a configuration of the second base station 400. The second base station 400 includes antennas 404*a* and 404*b*, a call processing function unit 420, a backhaul function unit 450, a baseband function unit 460 and an RF function unit 470.

Each component of the second base station 400 may be implemented by, for example, hardware such as electronic circuits. Further, the processing of each component of the second base station 400 may be implemented by executing a program under the control of an arithmetic device (not shown) included in the second base station 400 which is a computer. More specifically, the processing may be implemented by loading a program stored in a storage medium (not shown) included in the second base station 400 into a memory (not shown), and then executing the program under the control of the arithmetic device.

The call processing function unit 420 is, for example, the RRC. The call processing function unit 420 performs the call processing with the core network apparatus 120 via the backhaul function unit 450 and performs processing for establishing the communication path between the core network apparatus 120 and the second mobile terminal 500. Further, when the call processing function unit 420 receives a connection request signal from the second mobile terminal 500 in its communication region B via the RF function unit 470 and the baseband function unit 460, the call processing function unit 420 performs processing for establishing the communication path with that second mobile terminal 500. In other words, the call processing function unit 420 forms an RRC connection path for performing an RRC connection with the second mobile terminal 500 via the RF function unit 470 and the baseband function unit 460.

Further, as described later, the call processing function unit 420 performs the call processing with the first base station 200 and performs processing for establishing the wireless communication path with the first base station 200.

The backhaul function unit 450 performs processing necessary for performing communication with the core network apparatus 120 via the mobile backhaul 110. For example, the backhaul function unit 450 performs the conversion processing which complies with communication interface with the core network apparatus 120 such as S1 interface, and performs processing for transmitting signals. Specifically, the backhaul function unit 450 performs the conversion processing, which complies with, for example, the S1 interface, for the signals from the core network apparatus 120, and outputs the converted data to the baseband function unit 460 or the call processing function unit 420. Further, the backhaul function unit 450 performs the conversion processing, which complies with, for example, the S1 interface, for data from the baseband function unit 460, and outputs the converted data to the core network apparatus 120.

The baseband function unit 460 performs processing related to baseband signals. Specifically, the baseband function unit 460 performs conversion processing for data from the backhaul function unit 450 to generate baseband signals, and outputs the baseband signals to the RF function unit 470. Further, the baseband function unit 460 performs conversion processing for the baseband signals from the RF function unit 470 to generate data, and outputs the data to the backhaul function unit 450.

The RF function unit 470 performs processing necessary for wireless communication such as the modulation/demodulation processing and the amplification processing. Specifically, the RF function unit 470 performs processing such as the modulation processing and the amplification processing for the baseband signal output from the baseband function unit 460, and transmits the wireless signal to the second mobile terminal 500 or the first mobile terminal 300 via the antennas 404*a* and 404*b*. Further, the RF function unit 470 receives the wireless signal from the second mobile terminal 500 or the first base station 200 via the antennas 404*a* and 404*b*, performs processing such as the demodulation processing and the amplification processing to convert the wireless signal into the baseband signal, and transmits the baseband signal to the baseband function unit 460.

Note that, when the baseband function unit 460 receives, from the RF function unit 470, the connection request signal, which is transmitted from the first base station 200, including the inter-base-station communication path setting information, the baseband function unit 460 may output this connection request signal to the call processing function unit 420. By receiving this connection request signal including the inter-base-station communication path setting information, the call processing function unit 420 performs the call processing with the first base station 200 and performs processing for establishing the wireless communication path with the first base station 200. In this case, the second base station 400 is configured to perform the wireless communication with the first base station 200 as if it is treating the first base station 200 as a mobile terminal.

Figure 5:
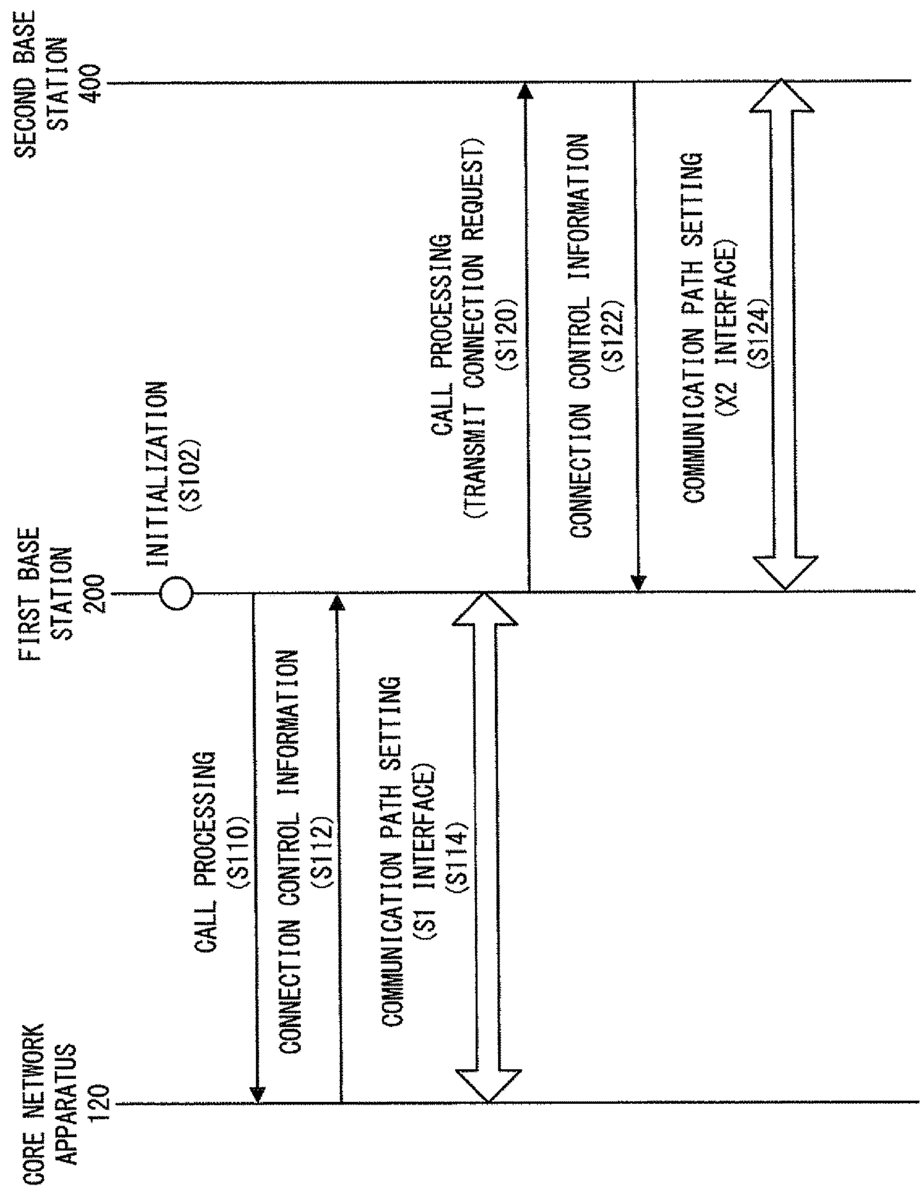
FIG. 5 is a sequence diagram indicating the whole processing of the wireless communication system according to the first exemplary embodiment.

FIG. 5 is a sequence diagram indicating the whole processing of the wireless communication system 100 according to the first exemplary embodiment. Note that, in the sequence diagram show in FIG. 5, the order of the processes (steps) can be changed as appropriate. Further, while one process (step) is being executed, another process (step) may be executed. Further, at least one of the multiple processes (steps) may be omitted.

When the first base station 200 is installed or restarted, the first base station 200 performs initialization (S102). Specifically, the first base station 200 performs processing for enabling services in its communication region A (cell setting). Further, the first base station 200 performs setting for resources related to the wireless communication (e.g., frequency used for the wireless communication and the like).

Next, the first base station 200 performs the call processing for the core network apparatus 120 (S110). Specifically, the call processing function unit 220 of the first base station 200 transmits the connection request signal to the core network apparatus 120 via the backhaul function unit 250. When the core network apparatus 120 receives the connection request signal from the first base station 200, the core network apparatus 120 transmits connection control information to the first base station 200 (S112).

Therefore, the communication path is set between the first base station 200 and the core network apparatus 120 (S114). Specifically, when the call processing function unit 220 receives the connection control information via the backhaul function unit 250, the call processing function unit 220 performs processing for establishing the communication path with the core network apparatus 120. This communication path between the first base station 200 and the core network apparatus 120 may comply with, for example, S1 interface.

Moreover, the setting of the communication path between the first base station 200 and the core network apparatus 120 enables the communication path to be established between the first mobile terminal 300 in the communication region A of the first base station 200 and the core network apparatus 120. Further, this enables the first mobile terminal 300 to use wireless services with the core network apparatus 120.

Next, the first base station 200 performs the call processing for the second base station 400 (S120). Specifically, the call processing function unit 220 of the first base station 200 transmits the connect request signal including the inter-base-station communication path setting information to the second base station 400 via the communication path establishment function unit 240. In this case, the communication path establishment function unit 240 performs processing for establishing the wireless communication path with the second base station 400.

When the second base station 400 receives the connect request signal from the first base station 200, the second base station 400 transmits the connection control information to the first base station 200 (S122). Specifically, when the second base station 400 receives the connect request signal (ConnectionSetupRequest), the second base station 400 checks a request factor included in the connect request signal.

More specifically, the baseband function unit 460 of the second base station 400 determines whether the inter-base-station communication path setting information is included in the connection request signal or not. When the baseband function unit 460 detects that the inter-base-station communication path setting information is included in the connection request signal, the baseband function unit 460 outputs this connection request signal to the call processing function unit 420. In other words, the general communication path setting processing by the connection request from the second mobile terminal 500 is transferred to the core network apparatus 120 via the backhaul function unit 450, without being terminated in the second base station 400. On the other hand, the communication path setting processing by the connection request from the first base station 200 is terminated in the second base station 400.

When the call processing function unit 420 receives the connection request signal, the call processing function unit 420 performs control so that the connection control information is transmitted to the first base station 200. Specifically, the call processing function unit 420 generates the connection control signal and transmits it to the baseband function unit 460. The baseband function unit 460 outputs the connection control information to the RF function unit 470. The RF function unit 470 performs the modulation processing for the connection control information, as mentioned above, and transmits it to the first base station 200.

Therefore, the communication path is set between the first base station 200 and the second base station 400 (S124). This communication path between the first base station 200 and the second base station 400 may comply with, for example, X2 interface. In the above-mentioned connection processing, the second base station 400 performs the connection processing as if the first base station 200, which is a request source, is a mobile terminal.

In the first exemplary embodiment, the second base station 400 is connected to the first base station 200 via the wireless communication path by X2 interface. Therefore, in the first exemplary embodiment, the second base station 400 can control the first base station 200, by using the communication path between the base stations.

In this way, in the first exemplary embodiment, the second base station 400 can control the first base station 200, by using the communication path between the base stations. Therefore, for example, the second base station 400 can execute, for example, carrier aggregation processing by controlling the first base station 200. Note that carrier aggregation means that bundling a plurality of carriers (aggregation) enables different frequency bands to be efficiently used and thereby user throughput becomes enhanced. Note that the frequencies of the plurality of the carriers which are aggregated may be continuous or may be discontinuous. Further, the frequencies of the plurality of the carriers which are aggregated may be in the same frequency band or may be in different frequency bands.

Specifically, the call processing function unit 420 of the second base station 400 transmits a control message for controlling the first base station 200 to the communication path establishment function unit 240 of the first base station 200 via the communication path (X2 interface) which is established between the second base station 400 and the first base station 200. For example, if the frequency for the communication region A of the first base station 200 is different from the frequency for the communication region B of the second base station 400, the second base station 400 may execute the carrier aggregation across the second base station 400 and the first base station 200 using this control message.

Specifically, the call processing function unit 420 transmits the control message indicating execution of the carrier aggregation to the communication path establishment function unit 240 via the communication path by X2 interface. When the communication path establishment function unit 240 receives the control message, the communication path establishment function unit 240 recognizes that the control message is a message from the second base station 400, and outputs it to the call processing function unit 220. The call processing function unit 220 performs processing necessary for executing the carrier aggregation in response to the control message.

Figure 6:
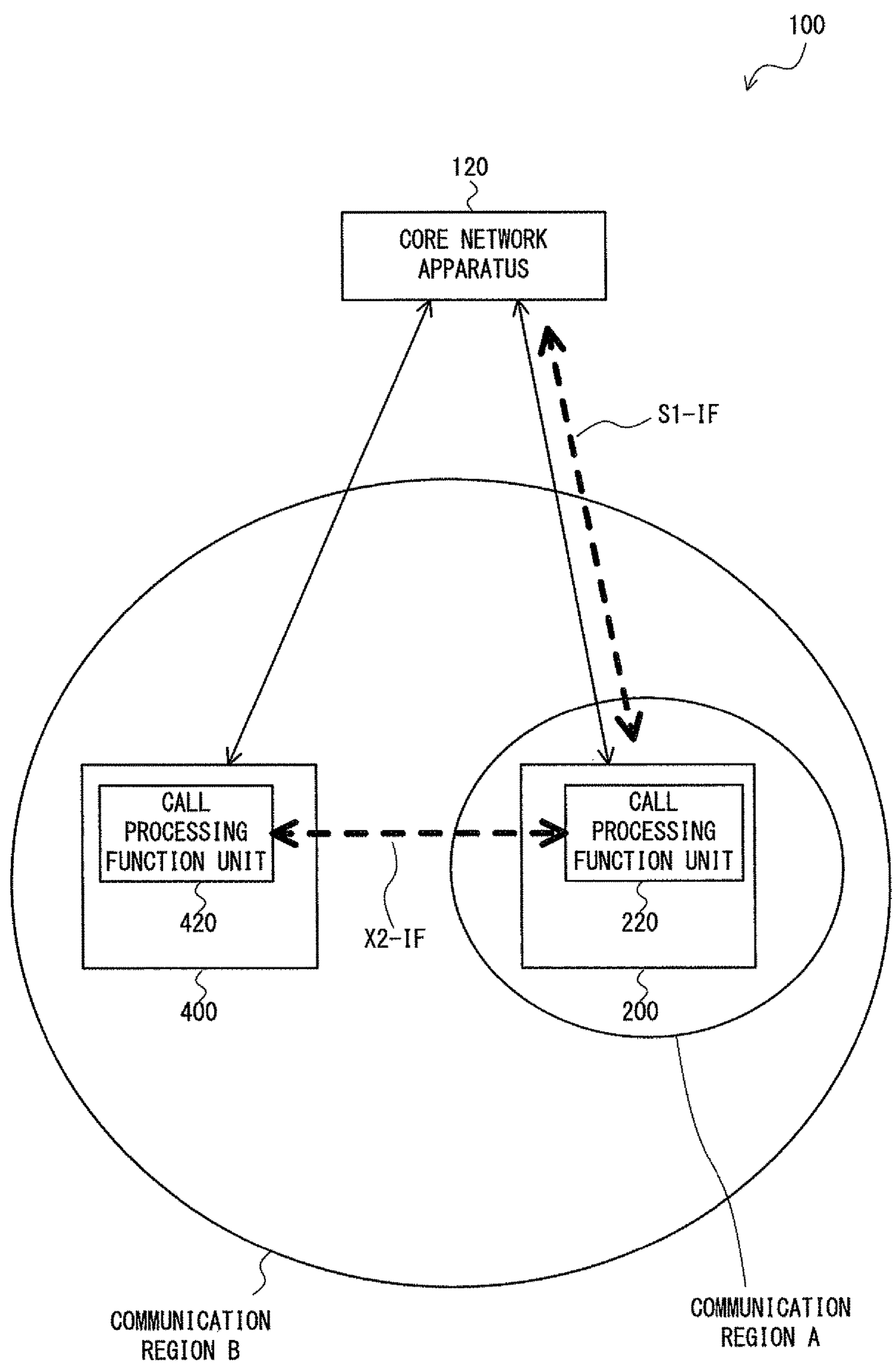
FIG. 6 is a conceptual diagram of the inter-base-station communication between the first base station and the second base station, according to the first exemplary embodiment.

FIG. 6 is a conceptual diagram of the inter-base-station communication between the first base station 200 and the second base station 400, according to the first exemplary embodiment. As mentioned above, the wireless communication path is established between the first base station 200 and the second base station 400. The call processing function unit 220 of the first base station 200 is wirelessly connected to the call processing function unit 420 of the second base station 400 by, for example, X2 interface via this wireless communication path. Note that, if the first base station 200 performs communication with a node (a base station or a mobile terminal) which cannot perform communication with the first base station 200, the first base station 200 can performs communication with the core network apparatus 120 by, for example, S1 interface.

As mentioned above, in the first exemplary embodiment, the communication path establishment function unit 240 is provided in the first base station 200. Thus, the call processing function unit 220 of the first base station 200 can connect it to the second base station 400, by RRC protocol such as call processing, via a general wireless interface by a mobile terminal. That is, the first base station 200 can be connected to the second base station 400, by, for example, X2 interface, using a user data communication path by a UE (User Equipment) in the case where a mobile terminal generally performs wireless communication with a base station.

Further, in this way, in the first exemplary embodiment, the first base station 200 is connected to the second base station 400 not through the mobile backhaul 110 and the core network apparatus 120. Therefore, it is possible to reduce load of the mobile backhaul 110 and the core network apparatus 120. Thus, the second base station 400 can easily control the first base station 200.

Moreover, in the first exemplary embodiment, as mentioned above, the communication path establishment function unit 240 is provided in the first base station 200. Thus, it is possible to establish the wireless communication path with the second base station 400 by a connection procedure in the case where a mobile terminal (UE) generally performs wireless communication with a base station. Therefore, the second base station 400 according to the first exemplary embodiment can be implemented by only a minimum number of modifications relative to an existing base station. Specifically, it is only necessary to modify the baseband function unit 460 so that the baseband function unit 460 transfers the connection request signal to the call processing function unit 420 when the inter-base-station communication path setting information is included in the connection request signal transmitted from the first base station 200.

Second Exemplary Embodiment

Next, a second exemplary embodiment is explained.

Figure 7:
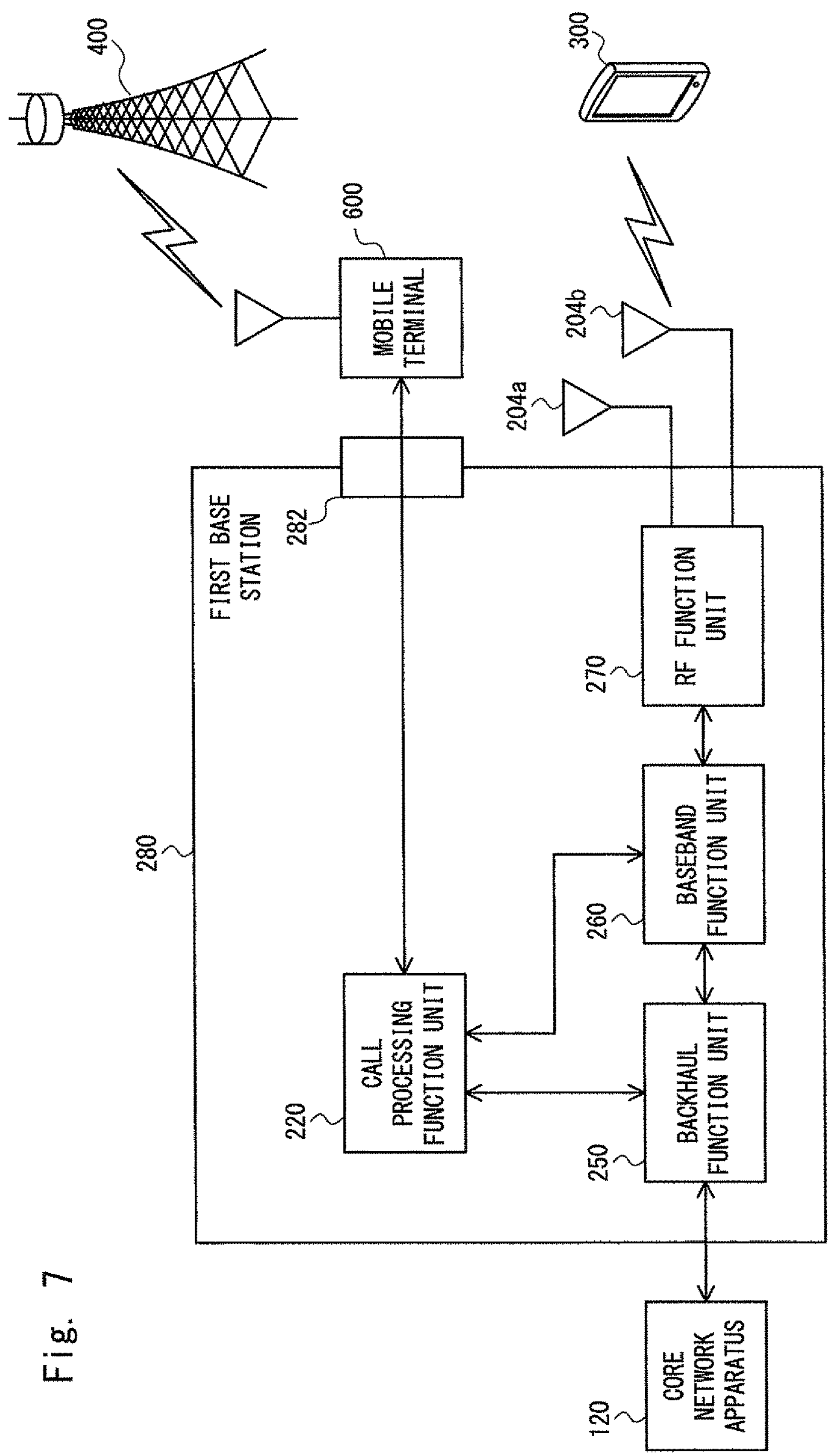
FIG. 7 shows a configuration of the first base station according to the second exemplary embodiment.

FIG. 7 shows a configuration of the first base station 280 according to the second exemplary embodiment. The first base station 280 differs from the first base station 200 according to the first exemplary embodiment in that the communication path establishment function unit 240 is not provided while a connection unit 282 is provided. Note that the configuration of the second base station 400 is the same as the one in the first exemplary embodiment. Further, like the first base station 200, the first base station 280 is, for example, a microcell base station which covers the relatively small communication region A with a radius of about a few meters to a few ten meters.

The connection unit 282 may be a general-purpose connection interface to which other general-purpose devices can be connected, such as a USB (Universal Serial Bus) port. It is possible to connect a general-purpose mobile terminal 600 to this connection unit 282. Therefore, the call processing function unit 220 of the first base station 280 is connected to the mobile terminal 600.

The mobile terminal 600 which is connected to the connection unit 282 can operate in a manner similar to the communication path establishment function unit 240 according to the first exemplary embodiment. That is, like the communication path establishment function unit 240, the mobile terminal 600 which is connected to the connection unit 282 can perform processing for establishing a wireless communication path (wireless link) with the second base station 400. Further, like the communication path establishment function unit 240, the mobile terminal 600 which is connected to the connection unit 282 can perform processing for transmitting/receiving wireless signals to/from the second base station 400. That is, the first base station 200 is configured to perform the wireless communication with the second base station 400 using the mobile terminal 600 which is connected to the connection unit 282, as if the first base station 280 itself is a mobile terminal.

Further, the call processing function unit 220 can perform the call processing with the second base station 400 via the mobile terminal 600 which is connected to the connection unit 282 and perform processing for establishing the wireless communication path with the second base station 400. In this case, the call processing function unit 220 can transmit the connection request signal to the second base station 400 via the mobile terminal 600 which is connected to the connection unit 282.

The mobile terminal 600 which is connected to the connection unit 282 can perform processing such as modulation processing and amplification processing for the signals from the call processing function unit 220 to comply with, for example, the X2 interface, and transmit the wireless signals to the second base station 400. Further, the mobile terminal 600 which is connected to the connection unit 282 receives the wireless signals from the second base station 400, performs processing such as demodulation processing and amplification processing to comply with, for example, the X2 interface, and outputs the processed signals to the call processing function unit 220. In this case, the mobile terminal 600 which is connected to the connection unit 282 can perform wireless communication directly with the second base station 400 not through the mobile backhaul 110 and the core network apparatus 120.

The first base station 280 according to the second exemplary embodiment is configured so that the general-purpose mobile terminal 600 can be connected to the connection unit 282. Therefore, unlike in the case of the first base station 200 according to the first exemplary embodiment, it is not necessary to internally mount the communication path establishment function unit 240. Thus, it is possible to enhance general versatility and possibility. In other words, it is possible to minimize the number of modifications from the existing base station for implementing the first base station 280 according to the second exemplary embodiment.

Modified Examples

Note that the present invention is not limited to the above-described exemplary embodiments, and they can be modified as desired without departing from the spirit and scope of the present invention, as mentioned later. For example, in the above-mentioned exemplary embodiments, the number of the base stations is two. However, three or more base stations may be configured to establish wireless communication paths. Further, in the sequence diagram shown in FIG. 5, processes of S110 to S114 may be omitted.

Further, in the above-described exemplary embodiments, the first base stations 200 and 280 are microcell base stations and the second base station 400 is a macrocell base station. However, the first base station 200 is not limited to being a microcell base station. In a similar way, the second base station 400 is not limited to a macrocell base station. For example, the first base station 200 and the second base station 400 are base stations which are adjacent to each other. That is, it is only necessary that the first base station 200 be in a communication region of the second base station 400 (communication region B) and that the first base station 200 can perform the wireless communication with the second base station 400. In other words, the whole of the communication region A of the first base station 200 need not be included in the communication region B of the second base station 400.

Further, in the above-mentioned exemplary embodiments, the present invention has been explained as being a hardware configuration, however the present invention is not limited to this. The present invention can also be realized by causing a CPU (Central Processing Unit) to execute an arbitrary process on a computer program.

The above-mentioned program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Although the present invention has been explained with reference to the exemplary embodiments, the present invention is not limited by above. Various modifications, obvious to those in the art, can be made to the configurations and details of the present invention within the scope of the invention.

The present application claims priority rights of and is based on Japanese Patent Application No. 2013-081924 filed on Apr. 10, 2013 in the Japanese Patent Office, the entire contents of which are hereby incorporated by reference.

REFERENCE SIGNS LIST

1 WIRELESS COMMUNICATION SYSTEM
2 FIRST BASE STATION
4 SECOND BASE STATION
22 FIRST CALL PROCESSING MEANS
24 COMMUNICATION PATH ESTABLISHMENT MEANS
42 SECOND CALL PROCESSING MEANS
46 TRANSFER MEANS
100 WIRELESS COMMUNICATION SYSTEM
110 MOBILE BACKHAUL
120 CORE NETWORK APPARATUS
200 FIRST BASE STATION
220 CALL PROCESSING FUNCTION UNIT
240 COMMUNICATION PATH ESTABLISHMENT FUNCTION UNIT
250 BACKHAUL FUNCTION UNIT
260 BASEBAND FUNCTION UNIT
270 RF FUNCTION UNIT
280 FIRST BASE STATION
282 CONNECTION UNIT
300 FIRST MOBILE TERMINAL
400 SECOND BASE STATION
420 CALL PROCESSING FUNCTION UNIT
450 BACKHAUL FUNCTION UNIT
460 BASEBAND FUNCTION UNIT
470 RF FUNCTION UNIT
500 SECOND MOBILE TERMINAL
600 MOBILE TERMINAL

The invention claimed is:

1. A wireless communication system, comprising:

a first base station that performs wireless communication with a first mobile terminal (300); and a second base station, having a wireless communication region in which the first base station is included, and that performs wireless communication with a second mobile terminal (500), wherein the first base station comprises:

a communication path establishment unit that includes communication functions corresponding to functions of mobile terminals for performing wireless communication with the first base station not through a core network, said communication functions of the communication path establishment unit configured to establish a wireless link for transmitting and receiving control information between the first base station and the second base station not through the core network; and a first call processing unit that performs processing for establishing a communication path between a core network apparatus (120) and the first mobile terminal (300), and responds to a request signal from the first mobile terminal (300) for establishing a communication path with the first mobile terminal, the first call processing unit further configured to perform call processing for setting a wireless communication path to the second base station via the communication path establishment unit, wherein the second base station comprises:

a second call processing unit that performs processing for establishing the communication path between the core network apparatus (120) and the second mobile terminal (500), and performs call processing for setting a wireless communication path to the first base station; and a transfer unit that, when the transfer unit receives a signal for call processing from the first base station, transfers the signal to the second call processing unit, and wherein the wireless communication path set by the first call processing unit and the wireless communication path set by the second call processing unit are not through the core network.

2. The wireless communication system according to claim 1, wherein the functions corresponding to functions of mobile terminals comprise at least a function for which a mobile terminal establishes a wireless link with a base station.

3. The wireless communication system according to claim 1, wherein:

the first call processing unit transmits, to the second base station, a connection request by which a mobile terminal establishes a wireless link with a base station, the connection request including first information indicating setting of a wireless communication path between base stations; and the transfer unit transfers the connection request to the second call processing unit when the first information is included in the connection request.

4. A base station that performs wireless communication with mobile terminals, comprising:

a communication path establishment unit that is configured to perform communication functions corresponding to functions of mobile terminals for performing wireless communication with the base station not through a core network, said communication functions of the communication path establishment unit configured to establish a wireless link for transmitting and receiving control information between the base station and an other base station not through the core network; and a call processing unit that performs processing for establishing a communication path between a core network and a mobile terminal, and responds to a request signal from the mobile terminal for establishing a communication path with the mobile terminal, the call processing unit further configured to perform call processing for setting a wireless communication path to the other base station via the communication path establishment unit, wherein the wireless communication path, set by the call processing unit between the base station and the other base station, is not through the core network.

5. The base station according to claim 4, wherein the functions corresponding to functions of mobile terminals for performing wireless communication with the base station comprise at least a function for which a mobile terminal establishes a wireless link with a base station.

6. The base station according to claim 4, wherein the call processing unit transmits, to the other base station, a connection request by which a mobile terminal establishes a wireless link to a base station, the connection request including first information indicating setting of a wireless communication path between base stations.

7. A base station that performs wireless communication with mobile terminals, comprising:

a connection unit to which a mobile terminal can be connected; and a call processing unit configured to perform processing for establishing a communication path between a core network and the mobile terminal, and to respond to a request signal from the mobile terminal for establishing a communication path with the mobile terminal, the first call processing unit further configured to perform call processing for setting a communication path to an other base station, wherein, when the mobile terminal is connected to the connection unit, the call processing unit performs call processing for setting a wireless communication path to the other base station via the mobile terminal, and the mobile terminal performs processing for establishing a wireless link for transmitting and receiving control information between the base station and the other base station, and wherein the wireless communication path established by the call processing unit between the base station and the other base station is not through the core network.

8. A base station that performs wireless communication with mobile terminals, comprising:

a call processing unit configured to perform processing for establishing a communication path between a core network and a mobile terminal, and to respond to a request signal from the mobile terminal for establishing a communication path with the mobile terminal, the first call processing unit further configured to perform call processing for setting a wireless communication path to an other base station; and a transfer unit that, when the transfer unit receives a signal for call processing from the other base station, transfers the signal to the call processing unit, wherein the signal indicates a connection request by which mobile terminals perform wireless communication with the base station not through the core network, and wherein the call processing unit, when the signal is transferred from the transfer unit, establishes a wireless communication path with the other base station that is not through the core network.

9. The base station according to claim 8, wherein:

the signal is a connection request by which a mobile terminal establishes a wireless link to a base station;

the connection request includes first information indicating setting of a wireless communication path between base stations; and the transfer unit transfers the connection request to the call processing unit when the first information is included in the connection request.

10. A wireless communication method, comprising:

using, at a base station that performs wireless communication with a mobile terminal for establishing a communication path between a core network and the mobile terminal, functions that are included in mobile terminals for performing wireless communication with one or more other base stations not through the core network, in order to perform processing for establishing a wireless link for transmitting and receiving control information between the one or more other base stations not through the core network; and performing call processing for setting a wireless communication path from the base station to at least one of the one or more other base stations, wherein the wireless communication path between the base station and the one of the one or more other base stations set by the call processing is not through the core network.

11. The wireless communication system according to claim 2, wherein:

the first call processing unit transmits, to the second base station, a connection request by which a mobile terminal establishes a wireless link with a base station, the connection request including first information indicating setting of a wireless communication path between base stations, and the transfer unit transfers the connection request to the second call processing unit when the first information is included in the connection request.

12. The base station according to claim 5, wherein the call processing unit transmits, to the other base station, a connection request by which a mobile terminal establishes a wireless link to a base station, the connection request including first information indicating setting of a wireless communication path between base stations.

* * * * *